United States Patent [19]
Moriarty

[11] 3,946,617
[45] Mar. 30, 1976

[54] MOTION TRANSLATION MECHANISM
[75] Inventor: Maurice J. Moriarty, Phoenix, Ariz.
[73] Assignee: US Life Title Company of Arizona, Phoenix, Ariz.
[22] Filed: Nov. 5, 1973
[21] Appl. No.: 413,057

Related U.S. Application Data
[63] Continuation-in-part of Ser. No. 182,684, Sept. 22, 1971, abandoned.

[52] U.S. Cl.................... 74/60; 74/25; 64/17 R; 308/72
[51] Int. Cl............................................ F16h 23/00
[58] Field of Search............. 308/15, 72, 63, 55, 29, 308/122, 123, 94, 127; 64/17; 74/25, 60

[56] References Cited
UNITED STATES PATENTS

| 688,581 | 12/1901 | Bihlmaier | 74/60 |
|---|---|---|---|
| 1,799,167 | 4/1931 | Hulsebos | 74/60 |
| 1,867,385 | 7/1932 | Schlenker | 74/60 |
| 2,083,688 | 6/1937 | Clements | 308/72 |
| 2,234,836 | 3/1941 | Vick | 74/60 |
| 3,254,637 | 6/1966 | Durham | 308/72 |
| 3,802,278 | 4/1974 | Loomans | 64/17 |

Primary Examiner—Samuel Scott
Assistant Examiner—Wesley S. Ratliff, Jr.
Attorney, Agent, or Firm—Don J. Flickinger

[57] ABSTRACT

A novel motion translation mechanism is provided for translating rotary motion to reciprocal motion or reciprocal motion to rotary motion. The mechanism is adapted for use in a positive displacement machine for pumping and compressing fluids. A shaft is journaled for rotation within a stationary housing. An inclined annular bearing surface having an annular bearing thereon is integral with the shaft intermediate the journals. Reciprocal motion is imparted to a piston by a yoke ring journaled within the housing and interconnected to the annular bearing. A continuous seal arrangement is carried by the piston. Novel valve means control fluid flow within the machine.

5 Claims, 29 Drawing Figures

INVENTOR.
MAURICE J. MORIARTY
BY
ATTORNEY.

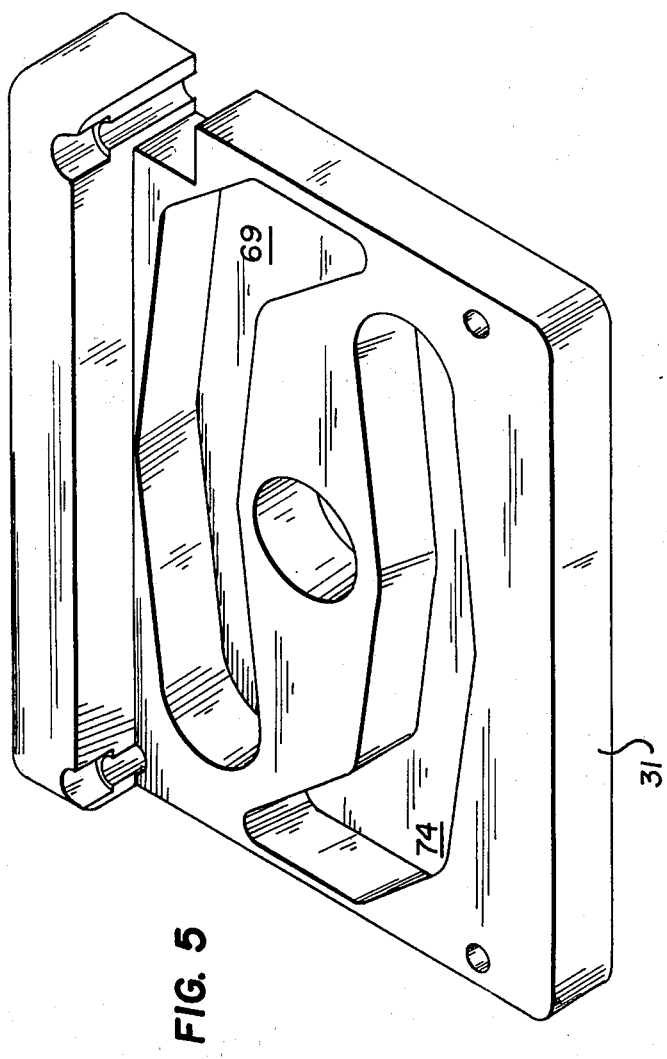
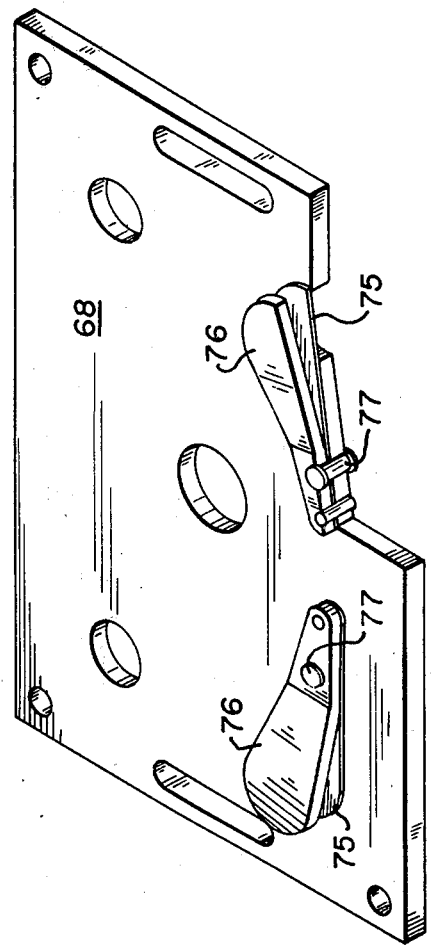

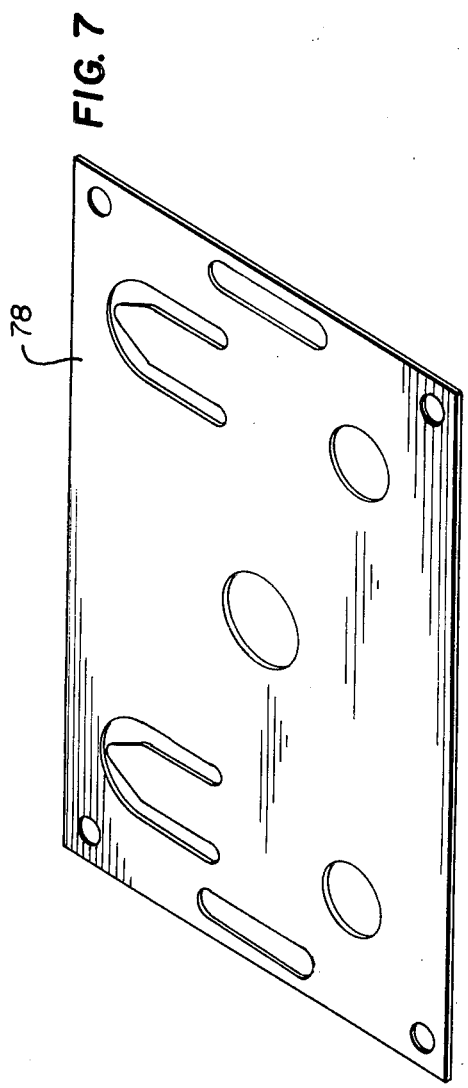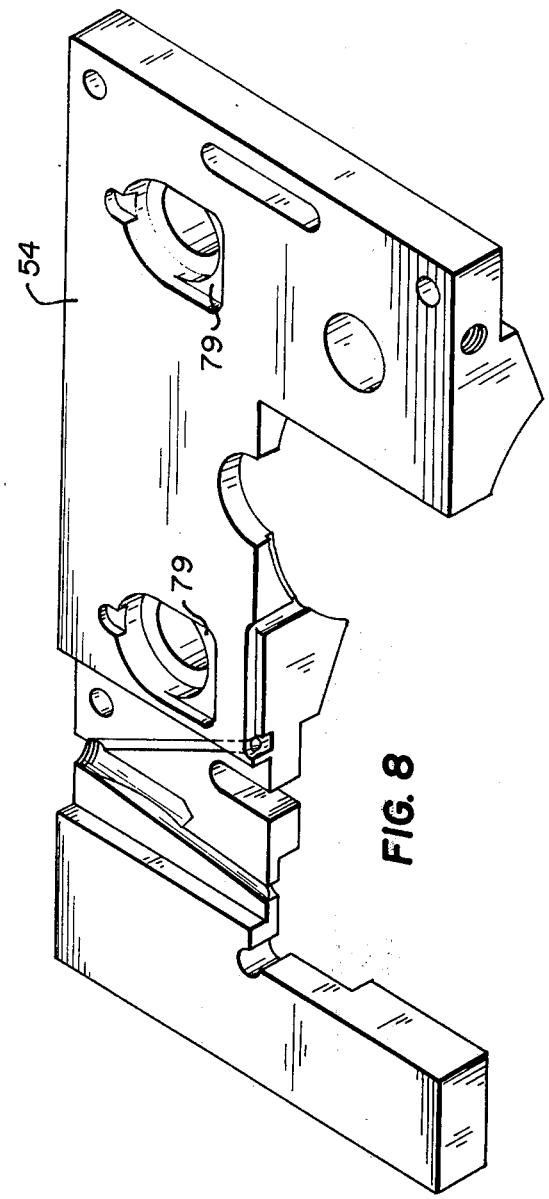

INVENTOR.
MAURICE J. MORIARTY

BY Martin L. Stoneman

ATTORNEY

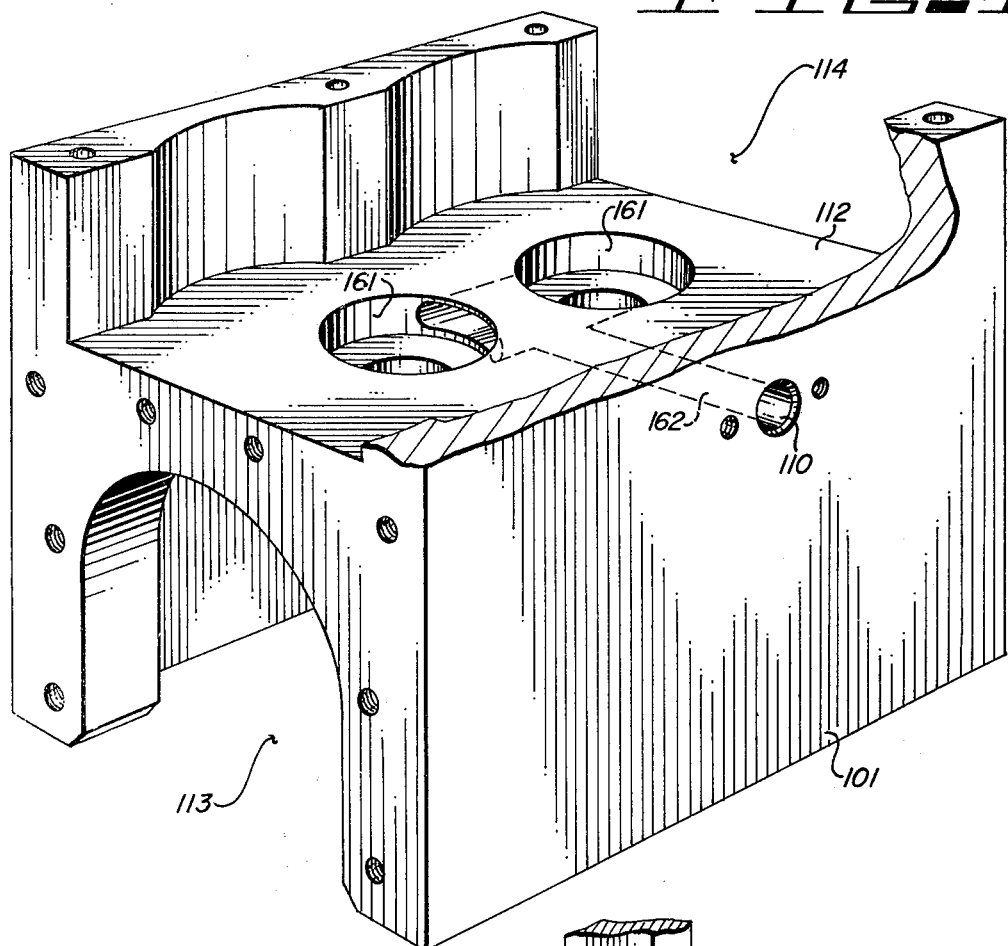
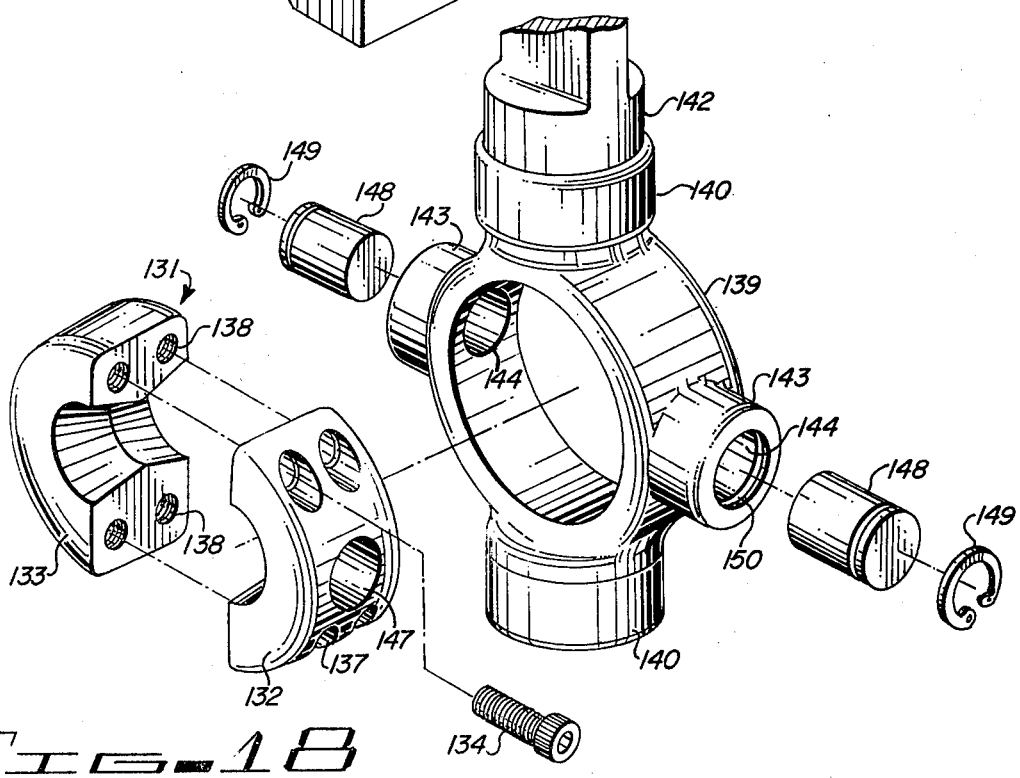

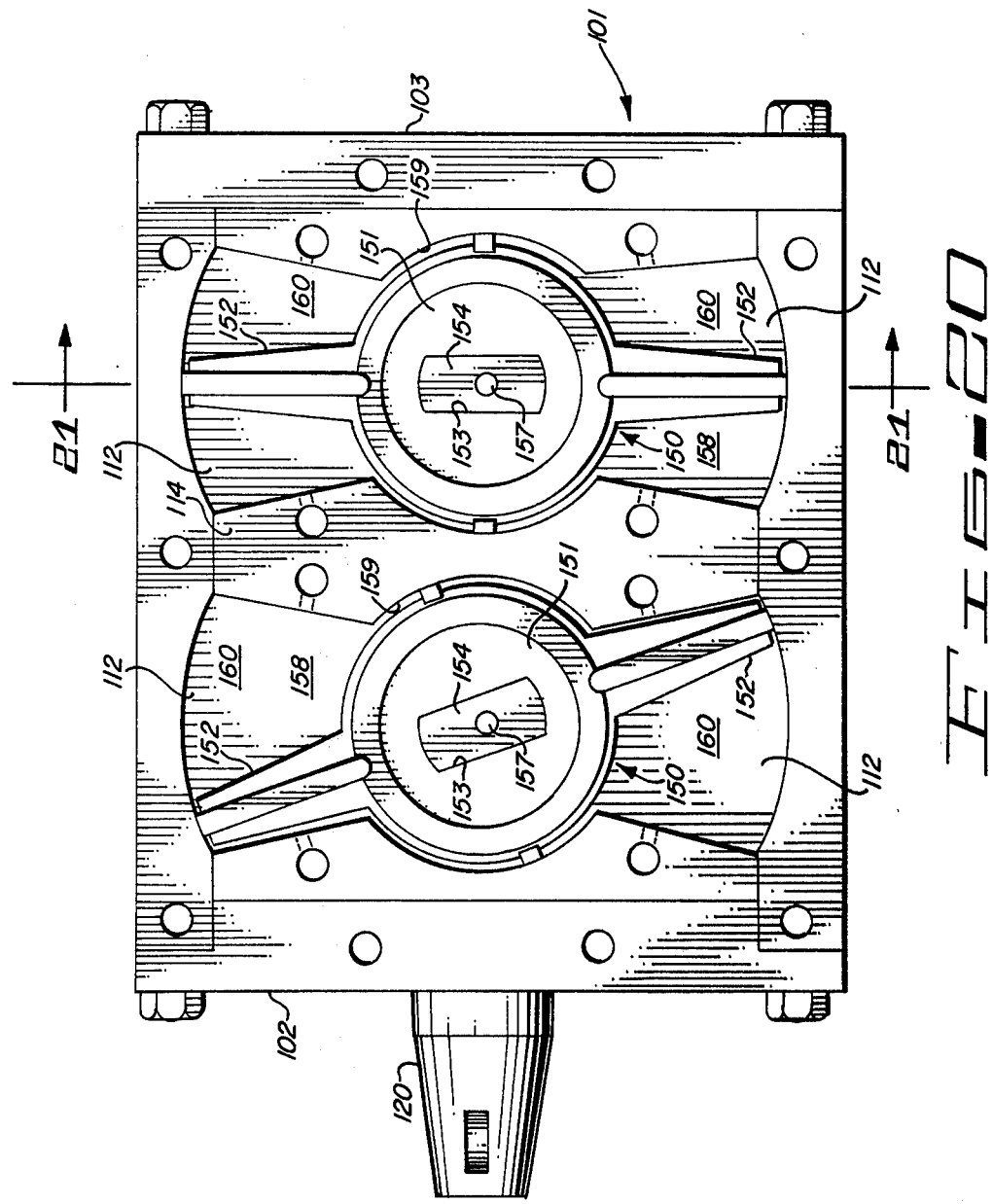

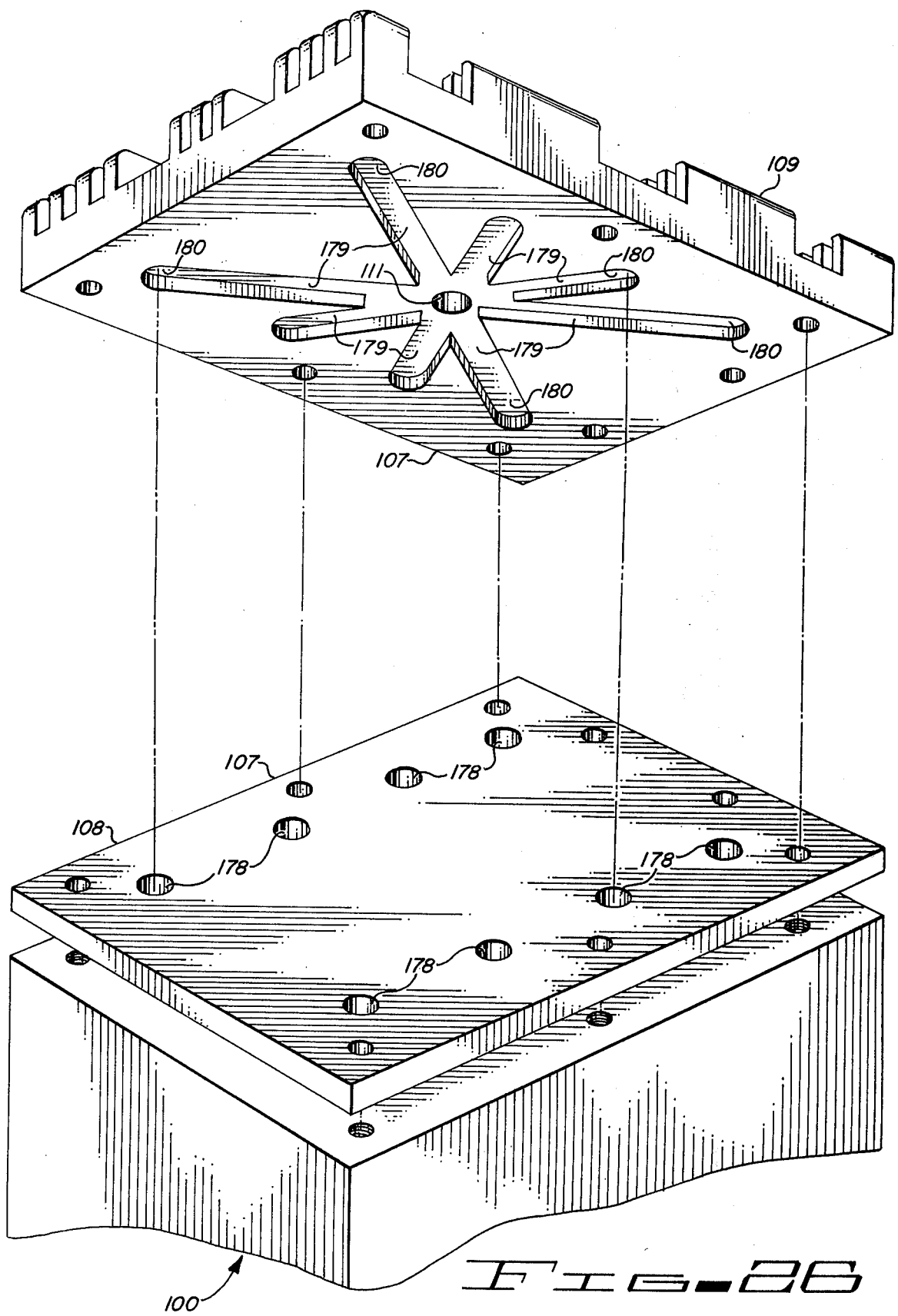

MOTION TRANSLATION MECHANISM

CROSS-REFERENCE TO RELATED PATENTS

The present application is a continuation-in-part application of the prior-filed copending U.S. patent application, Ser. No. 182,684, filed Sept. 22, 1971 now abandoned, entitled "Positive Displacement Machine".

BACKGROUND OF THE INVENTION

This invention relates to motion translation mechanisms.

More particularly, the invention concerns improvements in motion translation mechanisms of the type for converting rotary movement to reciprocal movement and for converting reciprocal movement to rotary movement.

In a further aspect, the invention concerns an improved motion translation mechanism which provides the mechanical drive assembly for a positive displacement machine.

In a still further aspect, the invention concerns a positive displacement machine having a rotatively reciprocating piston which is mechanically linked to a nutating journal of a rotating shaft.

In a yet further aspect, the invention concerns a compressor or the like in which the piston has no rubbing contact with its enclosing member.

In a yet still further aspect, the invention concerns a compressor which may easily and efficiently pump fluids or compress fluids which are free from the contamination of lubricants and provides for unidirectional flow of fluids and advantageous valving.

Motion translation mechanisms for converting rotary movement to reciprocal movement are generally well known. Earlier mechanisms of this type employed a mechanical linkage analogous to the conventional internal combustion engine, as described in United Kingdom patent No. 511,954. Herein, one end of a connecting rod is journaled on the offset bearing surface of a crankshaft which rotates about a first axis. The other end of the connecting rod imparts reciprocating motion to an element which oscillates about a second axis parallel to the first axis. While this type of mechanical drive assembly, based upon familiar components was relatively simple, it was exceedingly cumbersome and bulky and dictated that the rotating shaft and oscillating shaft had parallel axes.

Subsequently, a more sophisticated, but substantially compact, mechanical arrangement was developed for motion conversion. This type of motion conversion mechanism, as exemplified by U.S. Pat. No. 2,505,978, includes a rotating shaft having a nutating annular bearing surface integral with one end thereof. An annular bearing is retained upon the bearing surface by a cap member which is secured to the end of the annular bearing surface. A yoke disposed about the annular bearing is supported by trunnion pins which are journaled for rotatively reciprocating motion about an axis which is perpendicular to the axis of the rotating shaft. Pins, which are perpendicular to the trunnion pins, interconnect the annular bearing and the yoke and provide for relative movement therebetween.

The latter type of motion conversion mechanism was adapted to provide the mechanical drive assembly for a vane-type compressor unit as disclosed in U.S. Pat. No. 2,413,636. Each trunnion pin is extended to actuate a pair of radially opposed double-acting vane-type pistons contained within a partitioned cylindrical housing affixed to either side of the motion conversion mechanism housing. In this arrangement, four working chambers, each housing a double-acting piston and having two radially disposed intake valves and two radially disposed exhaust valves, are provided.

The foregoing configuration of rotatively reciprocating vane-type compressor never attained commercial significance. Having the piston chambers arranged in opposed relationship and having radial valving requiring substantial manifold structures to interconnect the numerous intake ports and exhaust ports, the unit is excessively bulky in relation to the volumetric capacity. The radial valving further requires a recess in the chamber wall which reduces the piston-swept area within the chamber, thus decreasing the potential compression ratio.

Extensive research, development and testing conducted by Applicant has proven that the motion translation mechanism considered as a separate unit has inherent structural deficiencies which adversely affect the stability and the service life of the assembly. The rotating shaft is supported and journaled by a single bearing intermediate the ends thereof as necessitated by the fact that a cap member must be secured to the end of the nutating bearing surface to retain the annular bearing thereon and the other end of the shaft must support a pulley or other driving means. The load upon the nutating bearing surface as it drives the rotatively reciprocating yoke applies a constantly shifting lateral force upon the rotating shaft, which rapidly destroys the shaft support bearing. Research has also shown that the force applied to the nutating bearing surface is perpendicular to the axis of the rotating shaft. Since the nutating bearing surface is at an angle to the axis of the rotating shaft, the load upon the bearing surface is absorbed by the extremes thereof which accelerates wear in these areas and imparts a barrel shape to the bearing surface.

As the motion translation mechanism wears, allowing undesired movement or "play" between the various components, the longitudinal and radial alignment of the shaft which supports the piston is impaired. Without adequate support, the vane-type piston is not stabilized within the chamber, causing excessive friction between the piston and the chamber. In an attempt to maintain proper clearances between the piston and the chamber, prior compressor art teaches the placement of a bearing within the chamber head to journal the outer end of the piston shaft. The inclusion of the latter bearing did not remedy the deficiency of longitudinal stability of the shaft or the piston and further complicated the structure by necessitating additional passages to deliver lubricating oil to the bearing.

Due to the undesirable charactersitics of motion translation mechanisms and vane-type reciprocating piston compressors utilizing such mechanisms as described above, most positive displacement machines in current usage are of the conventional reciprocating piston type. In conventional compressors and the like in general use today, it is necessary that the piston be supported within side walls, causing often unfavorable bearing loads and the necessity for lubrication in the immediate area of any fluids being pumped or compressed. Problems of this nature are only enlarged by designs which make these pistons double-acting in nature. Serious limitations are present in present designs with respect to making units of the type described small, light and inexpensive.

Positive displacement compressors in prior art systems may not be efficiently made vibration-free. Furthermore, there is serious restriction as to the use of seal materials and seal designs because of the nature of the ways in which the pistons must be supported and the difficulty in keeping fixed or relatively constant clearances between the piston and chamber walls.

It would be highly advantageous, therefore, to provide a positive displacement machine for compressors and the like which provides a fixed relationship between the piston and its chamber, may be efficiently operated without the need for lubricants in working areas, and which provides for efficient flow of fluids therethrough.

SUMMARY OF THE INVENTION

Accordingly, it is a primary object of the present invention to provide an improved motion translation mechanism.

Another object of the present invention is to provide a motion translation mechanism having enhanced wear characteristics and an extended service life.

A further object of the present invention is to provide an improved positive displacement machine having a more reliable mechanical drive assembly.

Still another object of the invention is to provide a positive displacement machine which is adapted to avoid lubricants in the working area.

A still further object of the present invention is to provide a positive displacement machine having a piston element which need not be supported by the chamber walls within which it works.

Yet a further object of the present invention is to provide a compressor or the like having maximum potential for unidirectional flow of fluids therethrough.

Yet still another object of the invention is the provision of a machine of the above type in which the piston element carries a continuous seal assembly for sealingly engaging the chamber.

Even still a further object of the invention is to provide a compressor or the like of the above type having novel valving means.

Even yet a further object of the present invention is to provide such a machine which is small in size and may be efficiently and economically constructed and operated.

Briefly, to achieve the desired objectives of the present invention, in accordance with a preferred embodiment of the motion translation mechanism thereof, first provided is a stationary housing. A first shaft is journaled for rotation about the longitudinal axis thereof at at least two points within the housing. One end of the shaft extends beyond the housing and is adapted for power input or output. The first shaft includes an integral annular bearing surface intermediate the journaled points thereof, the axis of the annular bearing surface being disposed at an angle to and intersecting the axis of the first shaft. An annular bearing, having separable segments, is rotatively carried upon the annular bearing surface. A yoke ring disposed upon the annular bearing is supported by a pair of diametrically opposed trunnion pins journaled for reciprocal movement within the housing. The longitudinal axis of the trunnion pins is perpendicular to the axis of the first shaft and intersects the intersection of the axes of the first shaft and the annular bearing surface. A pair of diametrically opposed bearing pins interconnect the annular bearing and the yoke ring and are journaled within either component for relative motion between the annular bearing and the yoke ring. The longitudinal axis of the bearing pins is perpendicular to the axis of the trunnion pins and intersects the intersection of the axes of the first shaft and the annular bearing surface. A second shaft, having the free end thereof adapted for power input or output alternate to the first shaft, is provided by an extension of one of the trunnion pins beyond its journal within the housing.

The motion translation mechanism, as described above, is adapted as the mechanical drive assembly for a positive displacement machine for pumping and compressing fluids by enclosing the components of the motion translation mechanism in the first compartment of a stationary housing having a partition therein to divide the housing into a first compartment and a second compartment. In this arrangement, the first shaft of the motion translation mechanism functions as the drive shaft of the positive displacement machine and the second shaft extends through the partition into the second compartment to support and actuate a piston element. The piston element has a cylindrical hub which is reciprocally rotatable with the piston shaft and a pair of opposed vanes extending radially outward from the hub. A chamber within the second compartment is shaped to cooperate with the piston element for cyclic volumetric change within the chamber in response to the rotatively reciprocating movement of the piston element. The piston element is totally supported by the piston shaft, which provides a fixed relationship between the piston element and the chamber, whereby the piston element does not contact the chamber. A cover member which is spaced from the piston element and engaged by the seal member thereof is secured to the housing over the second compartment to enclose the chamber. Intake valve means and exhaust valve means provide for the unidirectional flow of fluid as it is pumped and compressed within the chamber.

BRIEF DESCRIPTION OF THE DRAWINGS

Further and more specific objects and advantages of the present invention will become readily apparent to those skilled in the art from the following detailed description thereof, taken in conjunction with the drawings, in which:

FIG. 5 is a isometric view of the compressor embodiment of FIG. 2, illustrating provisions for fluid transfer;

FIG. 6 is an isometric view, partially in section, of the reed valve plate of the embodiment of FIG. 2;

FIG. 7 is an isometric view of the inlet reed valve of the embodiment of FIG. 2;

FIG. 8 is an isometric view, partially in section, of the inner housing section encasing the piston assembly at the front and in the rear of the compressor of FIG. 2;

FIG. 16 is a partial perspective view of the housing of the device of FIG. 15 with the various cover members and operative components removed therefrom;

FIG. 18 is an exploded perspective view of a portion of the motion translation mechanism of FIG. 17;

FIG. 20 is a plan view of the device of FIG. 15 with the top cover removed therefrom;

FIG. 26 is an exploded partial perspective view of the top portion of the device of FIG. 15;

DESCRIPTION OF THE PREFERRED EMBODIMENT

Figure 1:
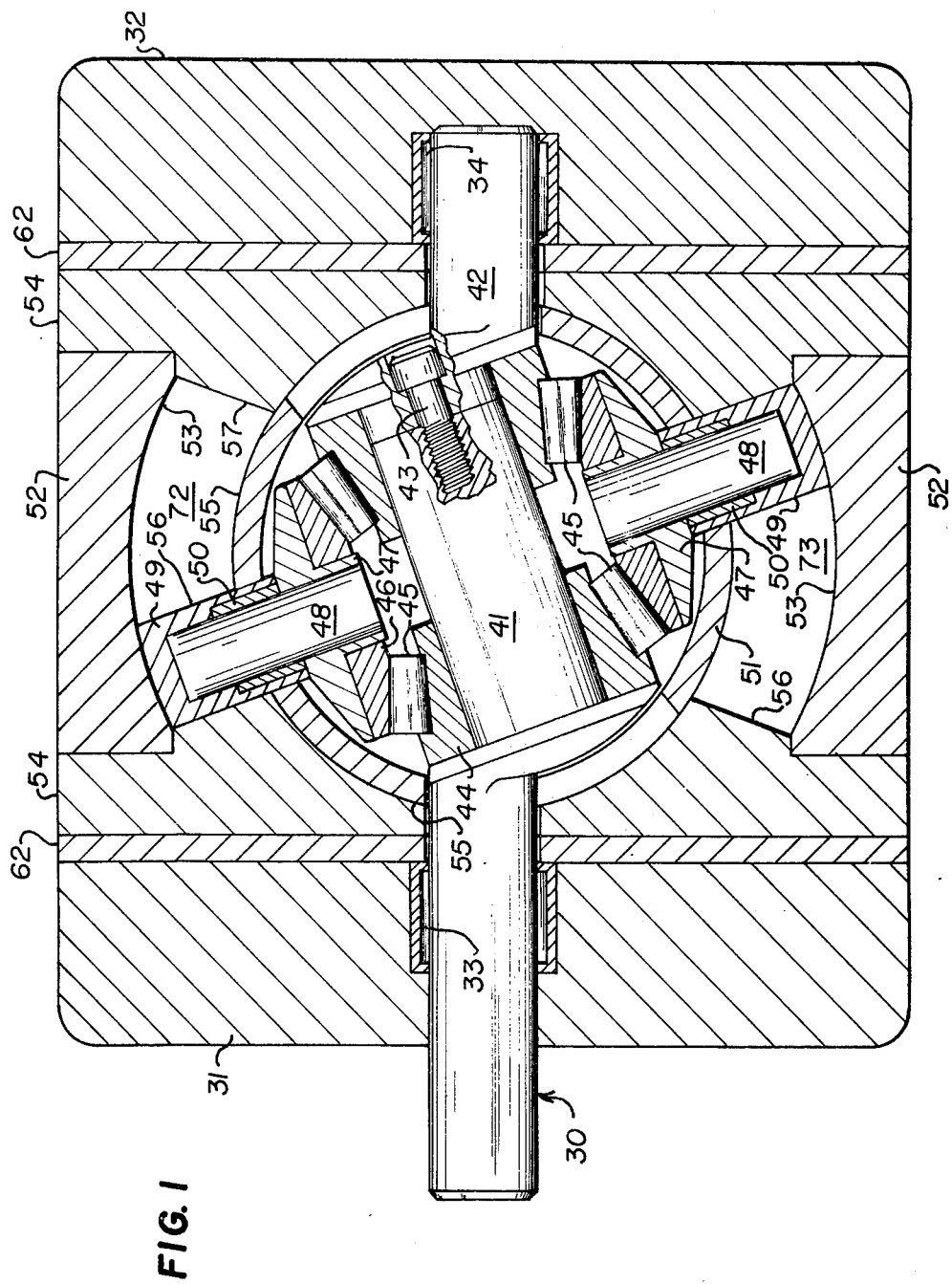
FIG. 1 is a side view, generally in section, of a preferred embodiment of the present invention.
Figure 2:
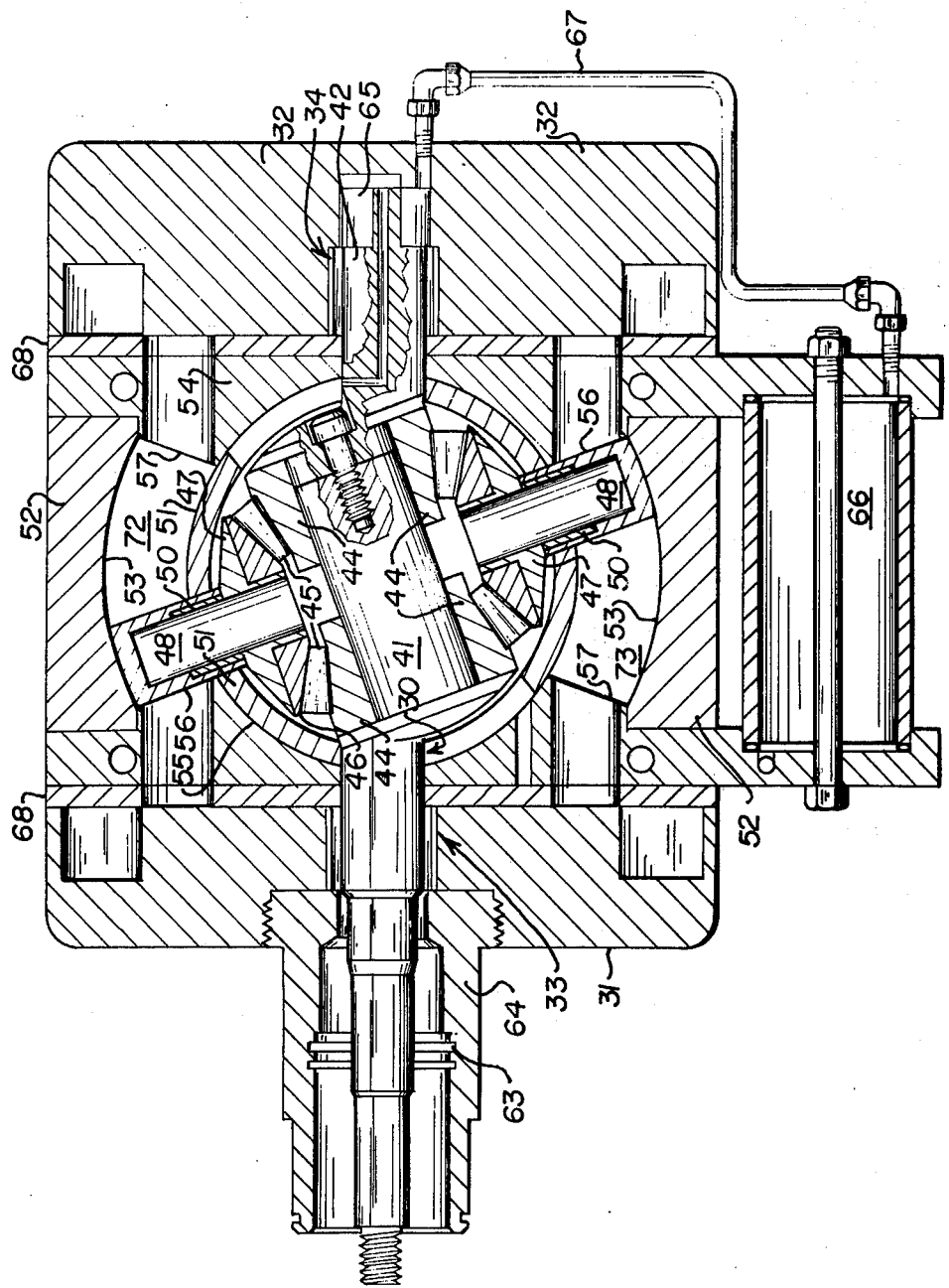
FIG. 2 is a side view similar to the view of FIG. 1 of the preferred embodiment shown in form for use as a compressor.
Figure 3:
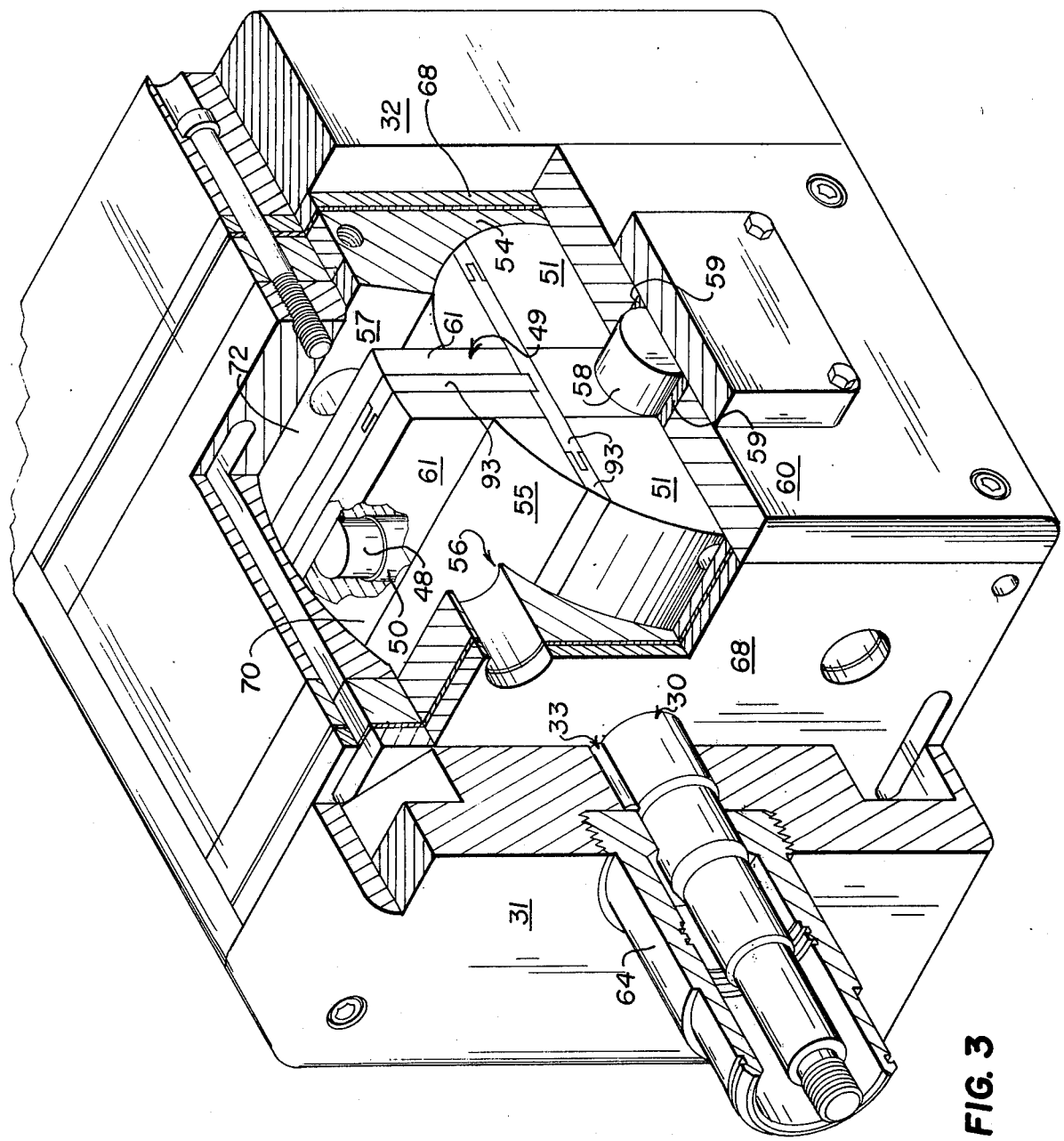
FIG. 3 is an illustrative isometric view, partially in section, of the compressor embodiment of FIG. 2.
Figure 4:
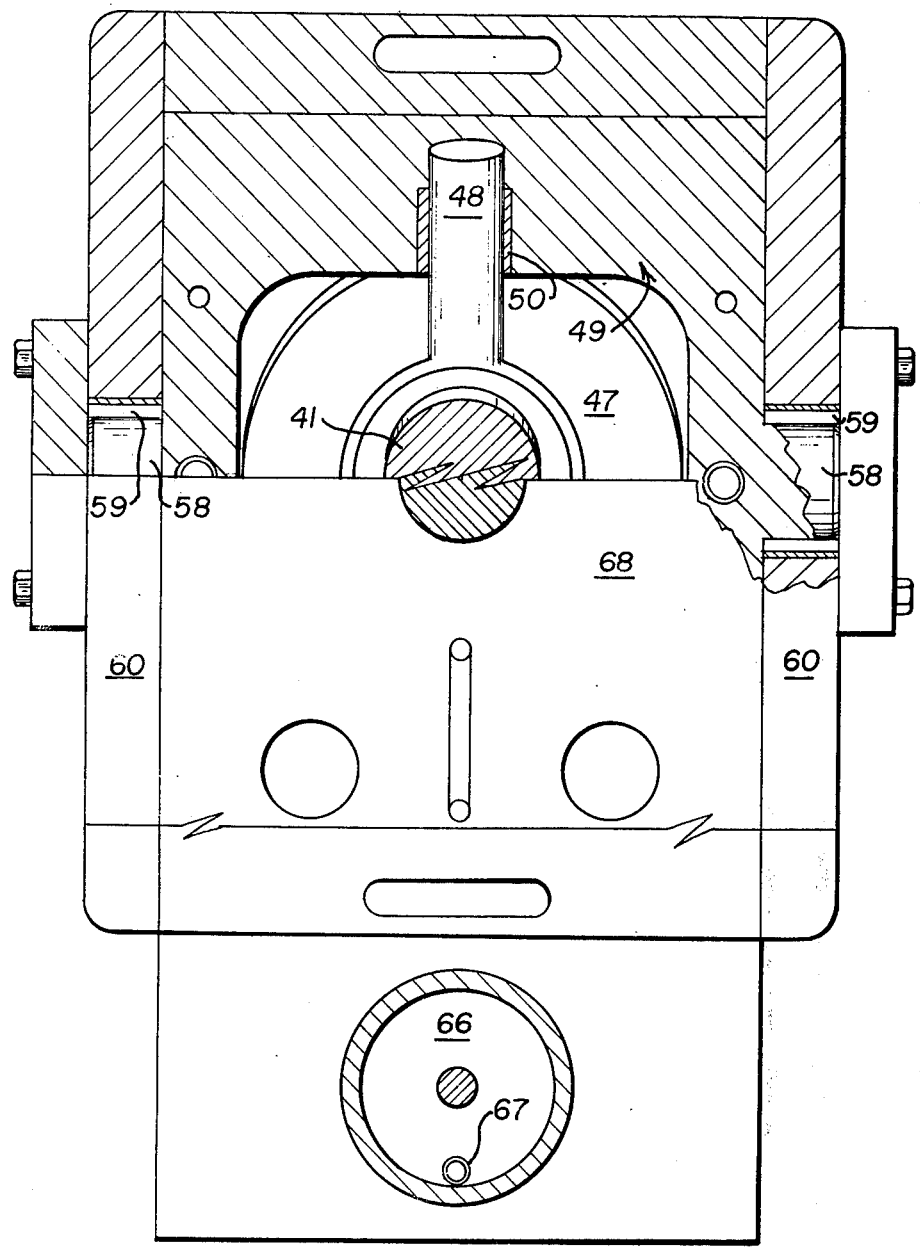
FIG. 4 is an end view, partially in section, of the compressor embodiment of FIG. 2.

Turning now to the drawings, in which the same reference numerals indicate corresponding elements throughout the various figures, FIG. 1 is illustrative of a general system for expanding and contracting chambers in a positive displacement manner in a preferred embodiment of the present invention. FIGS. 2, 3 and 4 illustrate generally the preferred embodiment as applied to a compressor system. The general system of the preferred embodiment will now be described with reference to FIGS. 1, 2, 3 and 4.

Z-shaft 30 is supported in end housings 31 and 32 by bearings 33 and 34, respectively, and is rotatable in bearings 33 and 34. Z-shaft 30 may be manufactured as one piece or a multiplicity of pieces and must provide a journal angularly disposed from the axis of shaft 30, said journal being connected to shaft 30 with suitable webbing. The inclined portion 41 of Z-shaft 30 is connected to the rear straight portion 42 of Z-shaft 30 by means of bolt 43. Bearing inner races 44, bearings 45, and bearing outer races 46, when assembled, form a roller bearing to rotatably mount piston pin holder 47 to the inclined portion 41 of Z-shaft 30.

Pins 48 are mounted in pin holder 47 so that the pins 48 have a common axis of rotation. This axis is perpendicular to the axis of inclined portion 41 of Z-shaft 30 and intersects the intersection between the axis of inclined portion 41 and the axis of rotation of Z-shaft 30. Pins 48 support piston 49 and are rotatable by being mounted within bearing 50 is piston 49. Cylindrical portion 51 of piston 49 is attached to piston 49 by bolts or other suitable attaching means (not shown). Cylindrical surfaces 53 of inner housings 52 and cylindrical surfaces 55 of inner housings 54 form the surfaces within which piston 49 and its attached cylindrical portion 51 operate.

Piston 49, as can be seen most clearly in FIGS. 3 and 4, has located thereon and extending therefrom, coaxially with cylindrical portion 51, trunnion pins 58. Trunnion pins 58 are mounted in bearings 59 and bearings 59 are mounted in side cover plates 60. This construction and mounting of trunnion pins 58 serves the purpose of locating the position of piston 49 in all directions except the direction coaxial with said trunnion pins 58.

The axis of trunnion pins 58 is perpendicular to the axis of rotation of Z-shaft 30 and intersects the intersection between the axes of Z-shaft 30, inclined portion 41, and pins 48.

Operation of the system described occurs when Z-shaft 30 is rotated in either direction. When Z-shaft 30 is rotated, the movement, in a well known manner, of the inclined portion 41 of Z-shaft 30 causes a nutating motion to be imparted to pin holder 47 through its bearings. Pin 48, on pin holder 47, moves piston 49 thereby providing a translation of the nutating motion of pin holder 47 to the arcuate reciprocation of piston 49 and its cylindrical portion 51 within the confines of the inner housings 52 and 54. It is seen that the motion of piston 49 is an arcuate reciprocation between surfaces 56 and 57 of inner housing 54. This oscillating or reciprocating action of piston 49 causes expansion and contraction of chambers formed between the side surfaces 61 of piston 49 and the opposing surfaces 56 and 57 of the respective inner housings. There are therefore provided four chambers 70, 71, 72 and 73 in the described embodiment, two chambers to one side of piston 49 and two chambers to the other side. Part 62 shown on FIG. 1 might be reserved for valving mechanisms, details of which are not described with respect to FIG. 1.

The application of the described embodiment of the present invention to a compressor system will now be described in detail, with reference to FIGS. 2 through 8. Corresponding parts between the compressor embodiment described and shown have similar reference numbers throughout as in the generalized description and showing of FIG. 1. The compressor embodiment utilizes the general system previously described but includes the following additions and modifications.

Z-shaft 30 is extended on its front end to provide for front shaft seal 63 and seal housing 64. Z-shaft 30 is extended on its rear portion 42 so as to be fitted with gear pump 65 for pumping lubricating oil from lube oil sump 66 through oil line 67, thus distributing lubricating oil through Z-shaft 30 to bearings 45. The provision of lubricating oil to necessary points of lubrication that may be required and then providing proper drainage through proper return lines to oil sump 66 are skills well known in the art and are not specifically shown.

FIG. 5 shows a partial section of end housing 31 and shows manifold chambers 69 and 74 which serve as a means of collecting discharge fluids towards a common discharge point which is not shown. FIG. 6 is a partial section of reed valve plate 68 showing one method of mounting reed valves to the plate, as shown by reed valve 75, reed valve stops 76 and reed valve attaching pins 77. FIG. 7 is a perspective view of another possible reed valve plate. The compressor embodiment as shown in FIG. 2 uses reed valves as shown in FIG. 6 for discharge and reed valves as shown in FIG. 7 as inlet means. FIG. 8 is a perspective view partially in section of inner housing 54 which shows reed valve stops 79 which are used in conjunction with reed valve 78. The use of reed valve plates and installation thereof is well known in the art and is not further elaborated upon.

There will now be shown and described with reference to FIGS. 9 through 14 another preferred embodiment of the present invention. It is not necessary, in the practice of the present invention, that the piston and chambers in which the work of the present invention is performed be located in the immediate area of the various mechanisms described for motion translation. Thus, it is seen that the rotation of the Z-shaft to produce a nutating motion of its bearing and pin holder, and the resultant oscillation or reciprocation of the piston trunnion pins may be accomplished without any adjacent piston or chambers; and the motion of the piston trunnion pins will serve or may serve as a power take-off to a piston of the present invention located exterior to the motion translation system. Such an embodiment will now be described.

Figure 9:
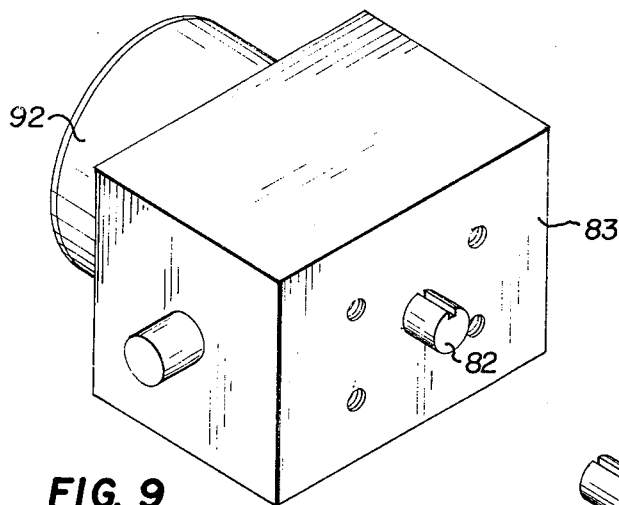
FIG. 9 is an isometric view of a second preferred embodiment of the present invention.
Figure 10:
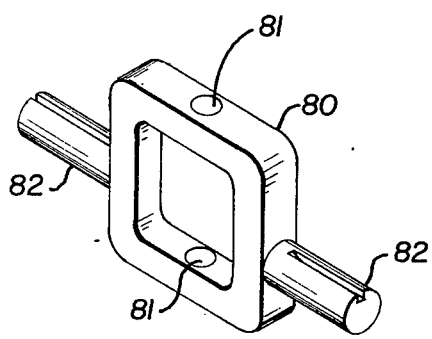
FIG. 10 is an isometric view of the yoke of the second preferred embodiment which replaces the piston of the first preferred embodiment.

FIG. 9 shows a box 83 within which a motion translation system as previously described is located. However, there are no piston or working chambers located therein. Yoke 80, shown in FIG. 10, is, instead, mounted on pins 48 in place of piston 49. Pins 48 are rotatably mounted in holes 81 of yoke 80. It is seen that trunnion pins 82 of yoke 80 now take the position of and function of trunnion pins 58 (as shown on FIG. 4). It will be obvious that there is no need for reed valve plates, reed valves, work chambers, or other parts related thereto within the motion translation mechanism box 83.

Figure 11:
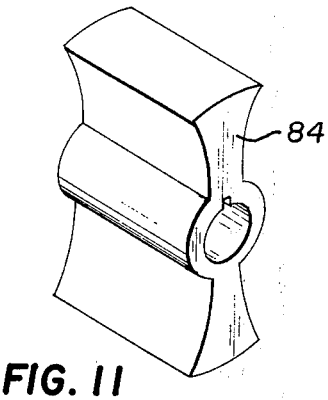
FIG. 11 is an isometric view of the piston of the second preferred embodiment.
Figure 12:
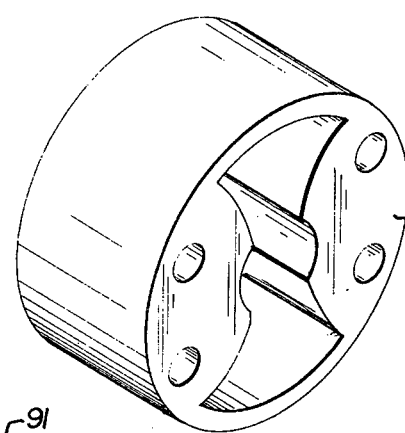
FIG. 12 is an isometric view of the piston chamber of the second preferred embodiment.
Figure 13:
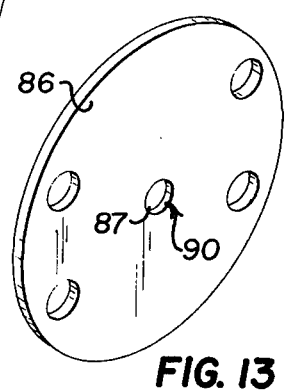
FIG. 13 is an isometric view of the piston chamber cover of the second preferred embodiment.

FIG. 11 is a perspective view of piston 84. FIG. 12 is a perspective view of piston housing 85. FIG. 13 is a perspective view of piston housing cover 86. Piston 84 is suitably attached to trunnion pin 82 so that the arcuate reciprocating motion of trunnion pin 82 is transmitted to piston 84. The movement of piston 84 within piston housing 85 causes the same type of expansion and contraction of chambers as described for the previous embodiment (FIG. 2).

Figure 14:
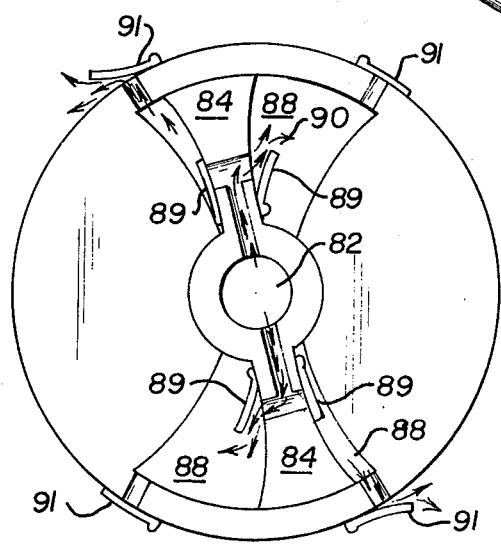
FIG. 14 is a schematic illustration illustrating the preferred flow characteristics of the second preferred embodiment.

FIG. 14 is a diagram showing a method by which the piston 84, piston housing 85, and piston housing cover 86, as shown in FIGS. 11 through 13, respectively, may be used to pump fluids in a unidirectional flow path when assembled and driven by trunnion pin 82. Fluids may be introduced into the wroking chambers by a means of inlet 87, shown in FIG. 13, which will correspond with suitable fluid passages in trunnion 82 and piston 84, and thereby introduced into the working chambers 88 through inlet flapper valves 89. Arrows 90 show the general flow path of fluids into the working chambers and thereby through the discharge reed valves 91.

It will be noted that valves 89 have been described as flapper valves. This description has been used since the arcuate reciprocating motion of piston 84 to which inlet flapper valves 89 are attached causes opening and closing of inlet flapper valves 89, or assistance in such opening and closing, as a result of inertial loads. It will also be noted that said opening and closing of inlet flapper valves 89 is naturally timed, inertially, for the fluid flow requirements of working chambers 88.

Piston and housing assembly 92, as shown on FIG. 9, indicates the possible use of a second piston, piston housing, and piston housing cover as shown in FIGS. 11 through 13, respectively, on the opposite side of the motion translation mechanism box 83 and driven by the trunnion 82 at the opposite end of yoke 80.

There will now be shown and described with reference to FIGS. 15 through 29 another alternately preferred embodiment of the present invention. Through research and development, as hereinbefore noted, it has been found that a substantially improved positive displacement machine or compressor generally of the type described in connection with FIGS. 9 through 14 would result if the second piston were added in tandem with the first piston on the same side of the motion translation housing. It was also found that a modified piston and chamber configuration cooperating with improved seals and valve arrangement provided a more efficient unit. Research also indicated variations to the motion translation mechanism for improving the wear characteristics and extending the service life thereof. Such a motion translation mechanism and a positive displacement machine specifically in the form of a compressor utilizing the motion translation mechanism as the mechanical drive assembly therefor will now be described in detail.

Figure 15:
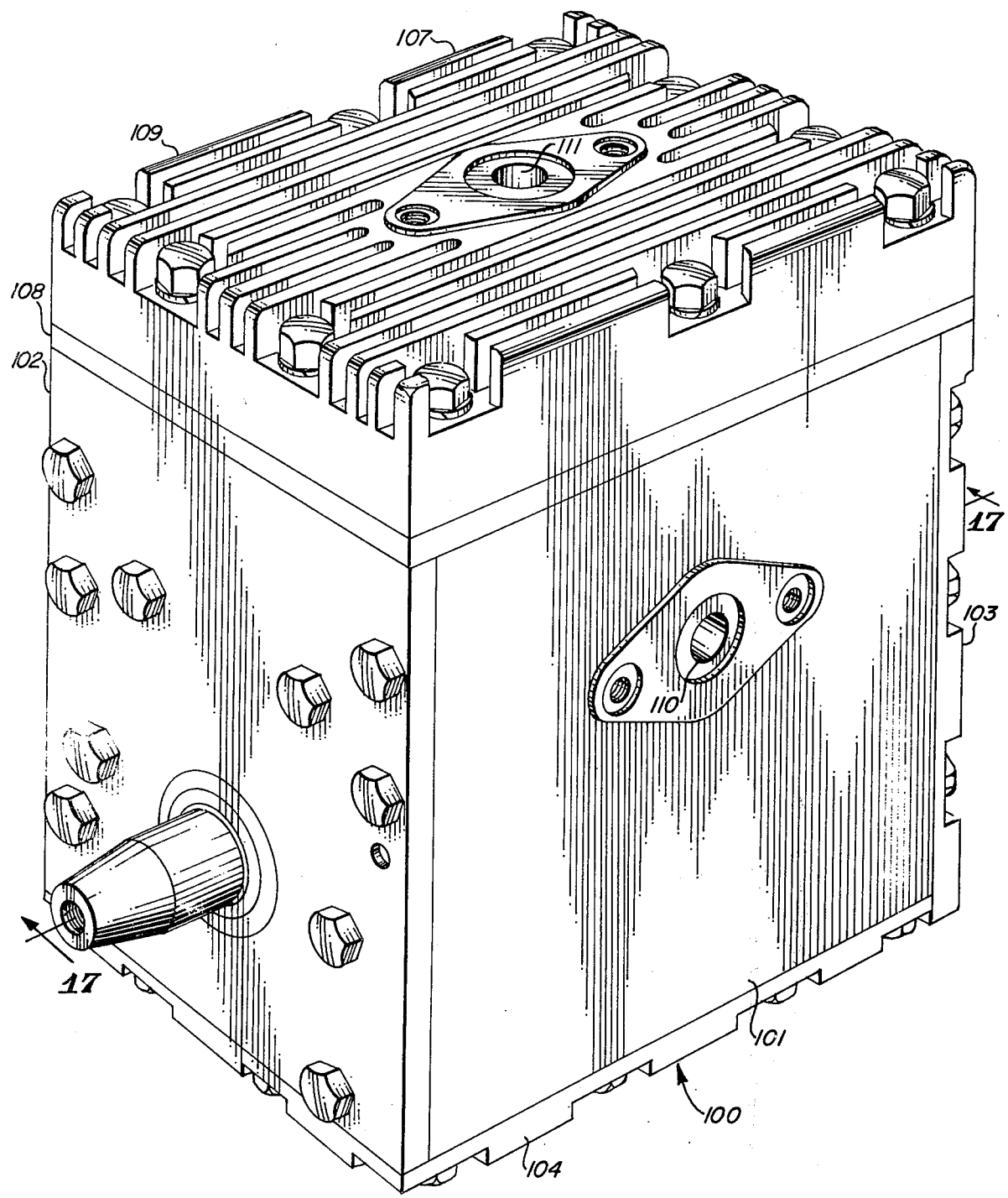
FIG. 15 is an alternately preferred positive displacement machine herein shown as a compressor constructed in accordance with the teachings of the present invention and embodying the motion translation mechanism of the present invention as the mechanical drive assembly.

A positive displacement machine constructed in accordance with the alternately preferred embodiment of the present invention specifically in the form of a compressor is illustrated in perspective in FIG. 15. The operative components of the machine, as will be described hereinafter in detail, are contained within a stationary housing generally designated by the reference character 100, which includes a frame member 101 having a front cover 102, a rear cover 103, a bottom cover 104 and a top cover 107. An intermediate plate 108 and an outer plate 109, taken together, form the top cover member 107. All cover members are rigidly removably affixed to the frame member with conventional sealing gaskets therebetween by an arrangement of dowel pins and bolts or other expediencies well known in the art. Fluids being pumped and compressed by the machine enter through a single intake port 110 and are discharged through a single exhaust port 111.

As seen in FIG. 16, the frame 101 has a transverse partition 112 which divides the housing 100 into a first compartment 113 and a second compartment 114. The piston elements are operatively located within the second compartment while the motion translation mechanism is journaled within the first compartment, which arrangement will be described presently. It is noted, however, that the housing 100 may be terminated at the upper surface of the partition 112, eliminating the second compartment 114 and the mechanical elements therein to provide a motion translation mechanism having utility other than the mechanical drive assembly of the positive displacement machine.

Figure 17:
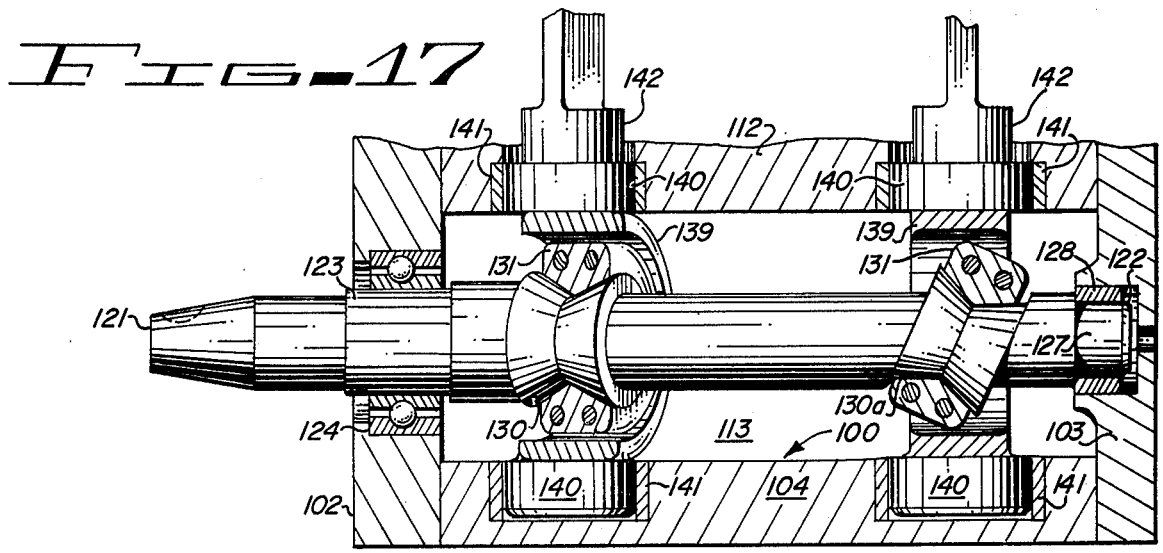
FIG. 17 is a vertical section view along the line 17—17 of FIG. 15 and illustrating the motion translation mechanism thereof.

Referring now to FIG. 17 and FIG. 18, it is seen that the motion translation mechanism has a first shaft 120 having a first end 121 and a second end 122. Proximate the first end 121 of the first shaft 120 is a cylindrical bearing surface 123 which is journaled for rotation within an antifriction bearing 124 supported by the front cover 102, while a cylindrical bearing surface 127 proximate the second end 122 of the first shaft 120 is journaled within a sleeve-type bearing 128 supported by the rear cover 103. For purposes of illustration, the forward bearing 124 is shown as a ball bearing while the rear bearing 128 is shown as a sleeve bearing such as might be provided by a bronze bushing. However, as will be appreciated by those skilled in the art, either bearing may be of any well-known type, such as roller bearing, ball bearing or sleeve bearing, depending on the particular application of the motion translation mechanism and the resultant load upon the shaft 120. In any case, it is noted that the shaft 123 is journaled for rotation about the longitudinal axis thereof and the first end 121 extends beyond the bearing 124 for the purpose of attaching a pulley, gear, or other device, for power input or output.

In accordance with a preferred embodiment of the invention, two identical annular bearing surfaces 130 and 130a are integrally formed in the shaft 120 between the bearings 124 and 128. Each annular bearing surface 130 and 130a, as best seen by viewing bearing surface 130a, is formed by the intersection of two cones having a coincident axis. The axis of the bearing surface is disposed at an angle to the longitudinal axis of the shaft 120 and intersects the axis of the shaft at the junction of the two cones. The angle of revolution of each cone, i.e. the angle between the axis and the surface of the cylindrical bearing surface, is equal to the angle between the axis of the shaft 120 and the axis of the annular bearing surface 130a. The particular arrangement of angles provides that a slant length line on each cone of each annular bearing surface 130 and 130a is parallel to the axis of the shaft 120. It is also noted that the axes of the annular bearing surfaces 130 and 130a are disposed at 90° to each other with respect to rotation about the axis of the shaft 120. The exact arrangement of axes and angles is particularly significant, as will be explained hereinafter in detail.

An annular bearing 131 is rotationally journaled about each annular bearing surface 130 and 130a, the inside diameter of each annular bearing 131 being shaped to mate with the annular bearing surfaces 130 and 130a. For assembly purposes, the annular bearing 131 is fabricated with separable halves 132 and 133 which are joined by cap screws 134 having the head and shank portion thereof received within the counterbored holes 137 and extending therethrough to threadedly engage the tapped holes 138 within the bearing half 133. Although not herein shown, the separable halves 132 and 133 of the annular bearing 131 may be further aligned with dowel pins, as is well known in the art.

Yoke rings 139 are disposed about the annular bearings 131. Each yoke ring has a pair of diametrically opposed trunnion pins 140 which are journaled for rotatively reciprocating movement within bearings 141 supported by the bottom cover 101 and the partition 112. The longitudinal axis of the trunion pins 140 about which the yoke ring 139 rotatively reciprocates is perpendicular to the axis of the shaft 120 and intersects the intersection of the axes of the shaft 120 and the annular bearing surface 130 and 130a, respectively. A second shaft 142 extends from the yoke ring 139 and has a longitudinal axis coincident with the axes of the trunnion pins 140.

A pair of diametrically opposed bosses 143 project from each yoke ring 139. The bosses 143 of each yoke ring 139 have a continuous bore 144 extending therethrough and having a longitudinal axis which is pependicular to the axis of the trunnion pins 140 and intersects the intersection of the axes of the first shaft 120 and the annular bearing surface 130. A blind bore 147 extending radially inward from each annular bearing half 132 and 133 is in alignment with the yoke ring bore 144. The yoke ring 139 and the annular bearing 131 are united by cylindrical bearing pins 148 which extend through the bore 144 of each boss 143 into the bore 147 of each bearing half 132 and 133. Each bearing pin 148 is retained by an integral snapring 149 which is engaged within a snapring groove 150 provided at the outboard end of each boss 143. A bearing pin 148 is journaled for rotation within the bore 144 or the bore 147, or both, to permit relative movement about the axis of the bearing pin 148 between the yoke ring 139 and the annular bearing 131.

In the foregoing described improved motion translation mechanism, the first shaft 120 is journaled for rotation, while the second shaft 142 is journaled for rotatively reciprocating movement. Herein, rotary movement may be converted to reciprocal movement by having power input through the first shaft 120 and receiving power from the free end of the second shaft 142. Conversely, reciprocal movement power may be applied to the free end of the second shaft 142 to produce an output of rotary movement at the first end 121 of the first shaft 120. As the annular bearing surfaces 130 of 130a are rotated by the shaft 120, the nutating movement thereof is imparted to the annular bearing 131 which is restrained from rotation by the bearing pins 148 engaging the yoke ring 139. The bearing pins 148 also transmit force between the annular bearing 131 and the yoke ring 139 causing rotatively reciprocating movement of the trunnion pins 140 within the bearings 141.

Due to the novel structure of the improved motion translation mechanism of the instant invention, each shaft 120 and 142 has a fixed location with respect to longitudinal and lateral movement. Due to the general V-shape of the annular bearing surfaces 130 and 130a and the mating configuration of the internal diameter of the annular bearing 131, the annular bearing 131 is positionally retained upon the annular bearing surface by the bearing surface without the need for flanges, end caps, snap rings, or other retaining devices. The trunnion pins 140 are restrained from lateral movement by the bearings 141. Similarly, the shaft 120 cannot move laterally against the bearings 124 and 128. The annular bearing 131 and the yoke ring 139, being interconnected by bearing pins 148, have a relative movement therebetween which is limited to rotation about the bearing pins 148. The improved motion translation mechanism, therefore, may be characterized as "self-aligning" and as will be apparent to those skilled in the art, thrust bearings are unnecessary since neither the first shaft 120 nor the trunnion pins 140 can move along their respective longitudinal axes. Accordingly, the second shaft 142, while rotatively reciprocating about the longitudinal axis thereof, is locationally fixed.

Research and testing has demonstrated that in a motion translation mechanism of the type described, the load generated between the annular bearing and the annular bearing surfaces as the bearing pins move the yoke ring, is characterized by force lines perpendicular to the axis of the first shaft. It has also been shown that this force lies along two diametrically opposed lines which extend inwardly from each end of the bearing surface to the center thereof. The force lines also rotate with the shaft. Prior art mechanisms which did not comprehend the inner action of forces between the annular bearing and the annular bearing surface and did not adequately accommodate these forces were subject to accelerated wear. In a cylindrical bearing surface with a cylindrical bearing, the force between the bearing and the bearing surface is a point contact at each edge of the bearing, which rapidly erodes the bearing surface to a convex or "barrel" shape. Rapid wear also occurs at the edges of the annular bearing. Further deterioration of the bearing surface is encountered since the first shaft is not supported on each side of the bearing surface and the movement of the yoke ring tends to move the free end of the shaft in a circular motion.

Since the motion translation mechanism of the present invention is not dependent upon auxilliary devices such as end caps to retain the annular bearing upon the annular bearing surface, it is readily apparent that the rotatable shaft may have one or several annular bearing surfaces to be operatively connected with a like number of rotatively reciprocating shafts in accordance with the intended use of the mechanism. A preferred use of the motion translation mechanism is the drive assembly for a vane-type positive displacement machine especially for pumping and compressing fluids. As used herein, the first shaft 120 becomes the drive shaft, while the second shaft 142 becomes the piston shaft. Such an embodiment will now be described.

Figure 19:
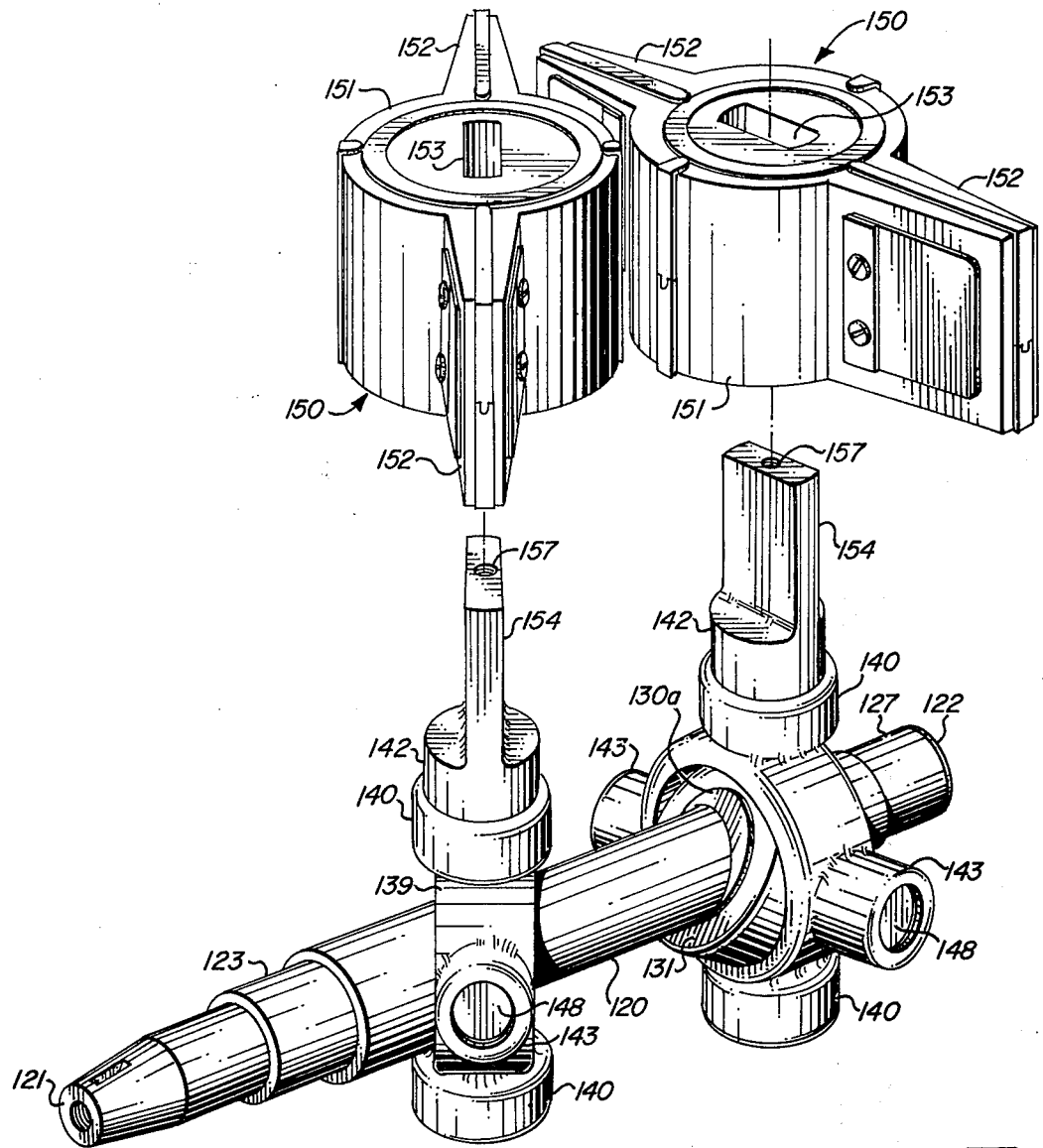
FIG. 19 is a perspective view of the assembled motion translation mechanism as adapted for the mechanical drive assembly for the compressor of the present invention and including the piston elements therefor.

Referring to FIGS. 19 and 20, a pair of piston elements 150 are located within the second compartment 114 of the housing 101. Each piston element 150 has a cylindrical hub 151 and a pair of opposed vanes 152 extending radially outward therefrom. Each piston element 150 has an elongate aperture or slot 153 extending longitudinally therethrough which receives the flattened portion 154 of the upper end of the piston shaft 142, such that the piston element 150 is supported and operatively driven by the shaft 142. Although not specifically herein shown, a bolt is engaged with the threaded aperture 157 for retaining the piston element 150 upon the shaft 142.

The second compartment 114 is divided into two chambers 158, each chamber being shaped to cooperate with a piston element 150 for cyclic volumetric change within the chamber in response to rotatively reciprocal movement of the piston element, as previously described in connection with the embodiment shown in FIG. 2. Each chamber 158 has a cylindrical center portion 159 which accommodates the cylindrical hub 151 and two diametrically opposed fluid chambers 160, within the vanes operate. It is especially noted that ample clearance exists between the piston element 150 and the various walls of the chamber 160, including the partition 112 and the intermediate cover member 108, such that the piston element 150 has no rubbing or wiping contact with the chamber surfaces. A continuous seal arrangement, as will be hereinafter described in detail, carried by the piston element sealingly engages the chamber.

Figure 21:
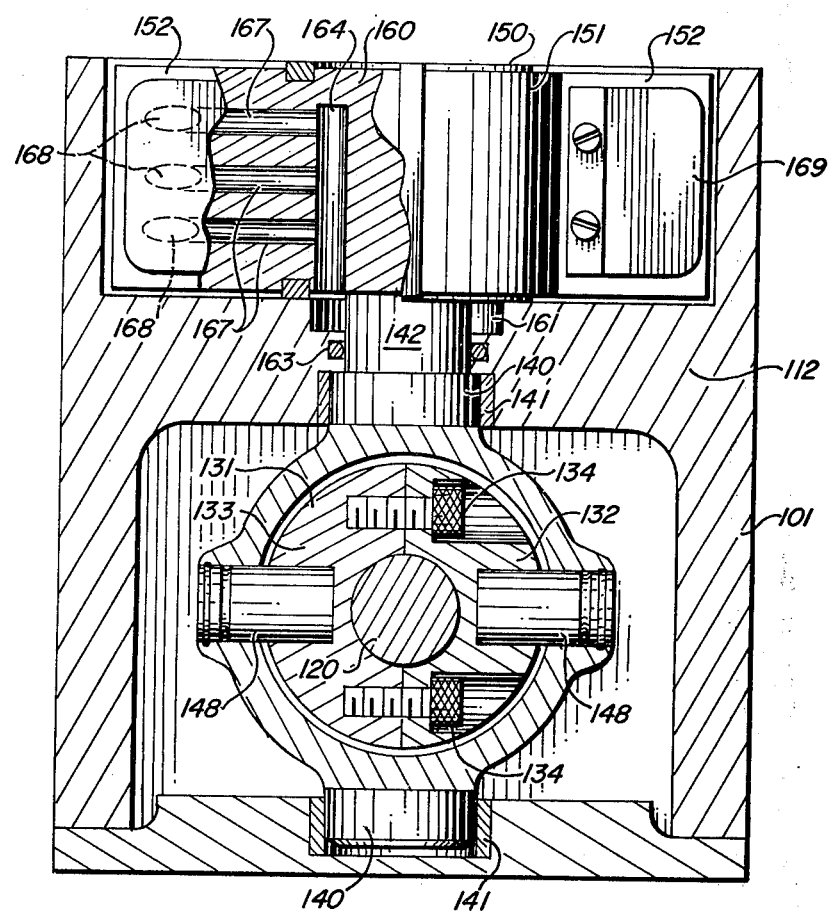
FIG. 21 is a vertical section view taken along the line 21—21 of FIG. 20.

Fluids are introduced into the fluid chambers 160 by an arrangement carried in part by the frame member 101 and the piston element 150, as best illustrated in FIG. 16 and FIG. 21. A counterbore 161 coaxial with each piston shaft 142 extends from the second compartment 114 into the partition 112. A conduit 162 extending transversely through the partition 112 communicates between each counterbore 161 and the common intake port 110 to provide a constant supply of fluids to the counterbores 161. An O-ring seal 163 engages the piston shaft 142 to prevent contamination of the fluids within the chamber 160 by the lubricating oil of the drive assembly in the first compartment 113. A first passage 164 within the cylindrical hub 151 has the lower end thereof in constant communication with the counterbore 161 through which fluid is passed to a plurality of second passages 167, terminating at exhaust ports 168 in the sides of the vanes 152. Although not herein shown, it is understood that each vane carries two sets of second passages 168 to deliver fluid from the first passage 164 into the fluid chamber 160 on either side of the vane 152. A flapper valve 169 similar to the valve 89, as described in connection with FIG. 14, functions as a one-way check valve to control the entrance of fluid into the fluid chamber 160. The flapper valve 169 is responsive to the pressure differential between the fluid in the passages 168 and the chamber 160 and opens as the vane 152 recedes from the wall of the chamber 158, creating a low pressure cavity.

Figure 23:
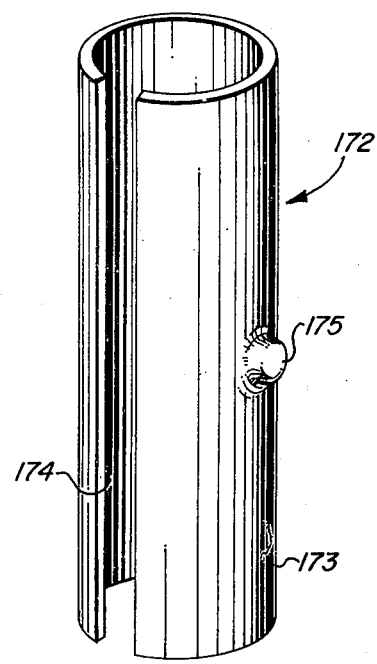
FIG. 23 is a perspective view of a one-way valve used in connection with the positive displacement machine of the present invention.
Figure 24:
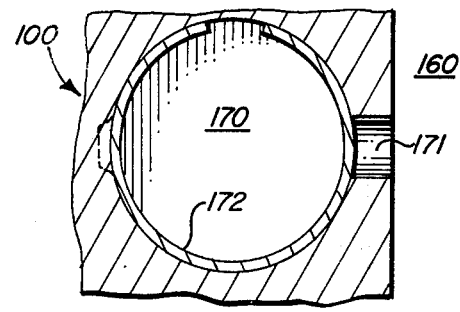
FIG. 24 is a horizontal section view of the valve of FIG. 23 as it would appear when installed for use in the compressor of the present invention.
Figure 25:
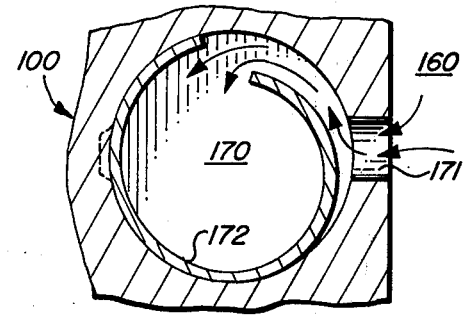
FIG. 25 is a horizontal section view corresponding to the view of FIG. 24, specifically illustrating the operation of the check valve.
Figure 22:
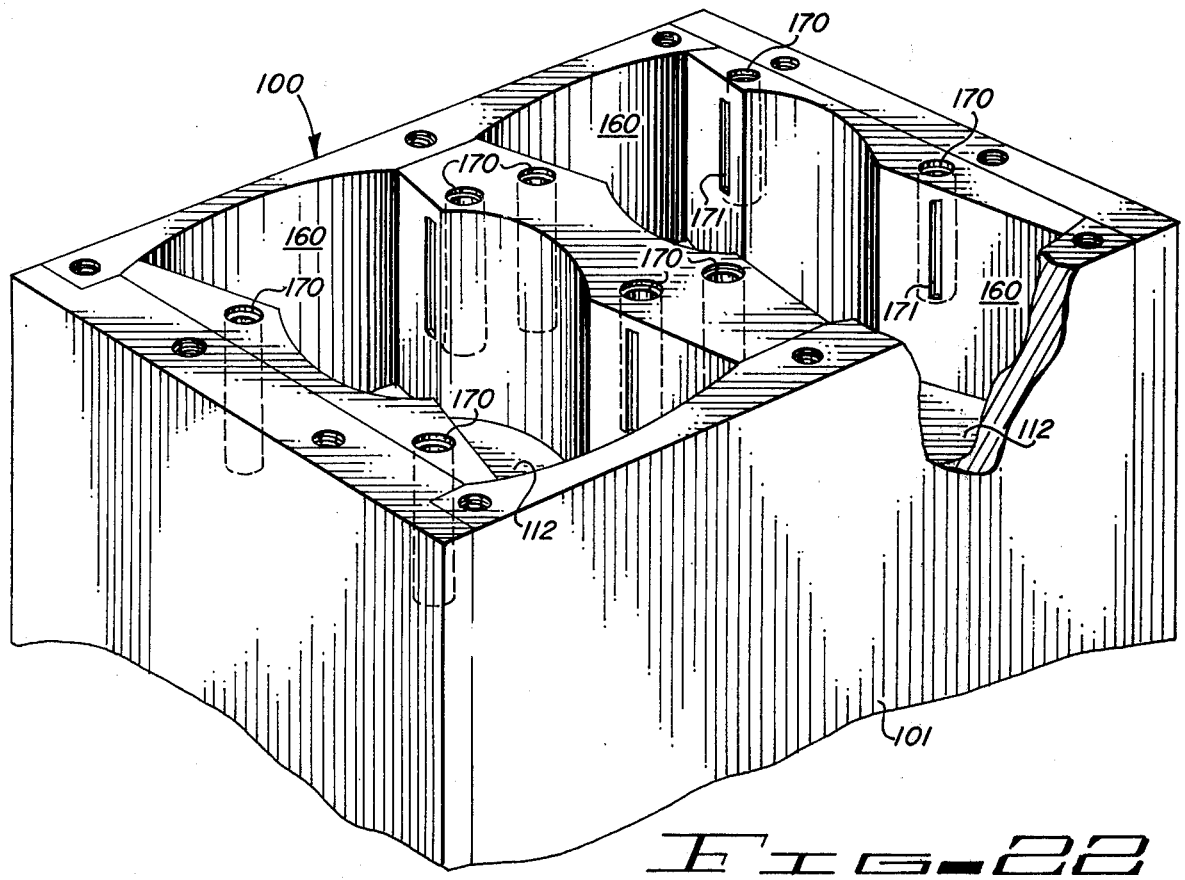
FIG. 22 is a partial perspective view corresponding to the view of FIG. 15, having the top cover and operative components removed therefrom.

As the vane 152 moves toward the wall of the chamber 158, the fluid therein is discharged through exhaust valve means, as illustrated in FIGS. 22–26. A cylindrical passage as might be formed by boring a limited-depth hole is located in the chamber wall and spaced from the surface thereof, which opposes the vane of the piston. A radial slit or passage 171 communicates between the cylindrical passage 170 and the fluid chamber 160. A one-way check valve 172, as seen in FIG. 23, is located within each cylindrical passage 170 to control the movement of fluids from the chamber 160 into the passage 170. The one-way check valve 172 has a resilient sleeve member 173 with a longitudinal slit 174 therealong to permit the edges of the sleeve member adjacent the slit 174 to be deformed inwardly. A projection 175, extending outwarding from the sleeve member 173, engages within a suitable recess within the cylindrical passage 177 to maintain orientation of the valve 172 in relation to the radial passage 171. In accordance with a preferred embodiment of the invention, the valve 172 is fabricated from the spring steel to have an outside diameter of such size to be received within the cylindrical passage in an air-tight arrangement with the normal biasing of the spring steel directed outwardly to close the radial passage 171, as seen in FIG. 24. As seen in FIG. 25, the valve 172 is sufficiently resilient to be inwardly deformable in response to differential pressure between the fluid chamber 160 and the cylindrical passage 170. As the fluid is compressed between the vane 162 and the wall of the chamber 158, the pressurized fluid moving through the radial passage 171 is sufficient to unseat a portion of the sleeve member 173, which normally closes the passage 171, whereupon the fluid is discharged from the fluid chamber 160 into the cylindrical passage 170.

The intermediate plate 108 of the top cover member 107 has a plurality of apertures 178 therein, one of each of the apertures 178 registering with one of the cylindrical passages 170 to form a continuation thereof. The outer plate 109 of the top cover member 107 has a single exhaust port 111 therethrough through which the fluid whichh has been pumped and compressed by the positive displacement machine of the present invention, is ultimately discharged. A plurality of grooves 179 in the undersurface of the outer plate 109 extend radially from the exhaust port 111. The outer end 180 of each radial groove 179 registers with one of the apertures 178 within the intermediate plate 108. When the intermediate plate 108 and the outer plate 109 are brought together with a suitable gasket therebetween to form the top cover member 107, each radial groove 179 becomes a conduit communicating between the cylindrical passage 170 and the exhaust port 111 for the passage of fluid therethrough.

Figure 27:
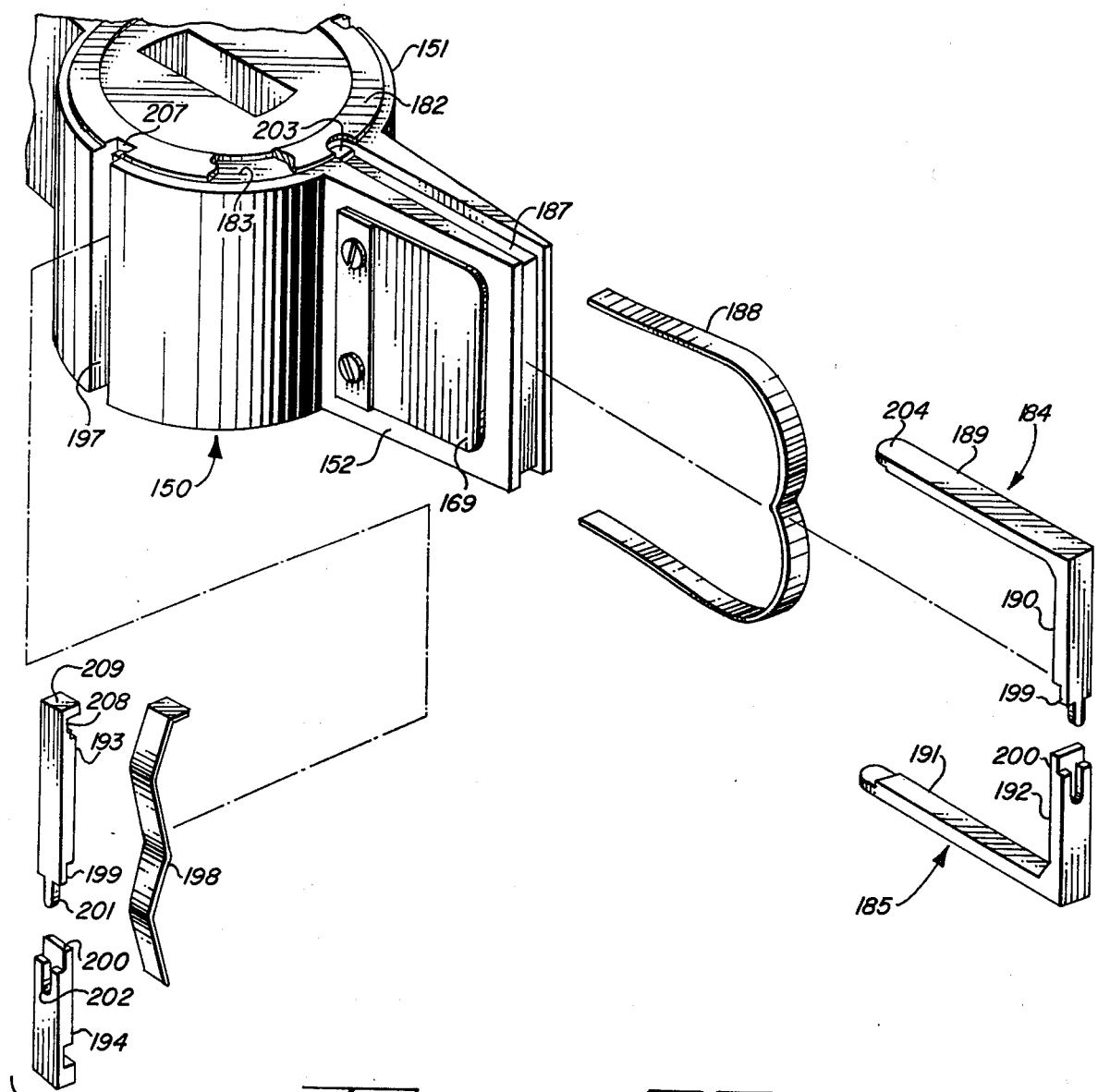
FIG. 27 is an exploded perspective view of the piston element and continuous seal arrangement carried thereby as used in the compressor of the present invention.
Figure 29:
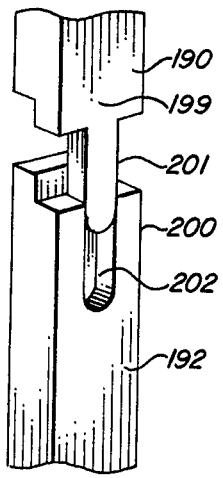
FIG. 29 is a partial perspective view particularly detailing the sealing engagement between the ends of the seal members as shown in FIG. 28.
Figure 28:
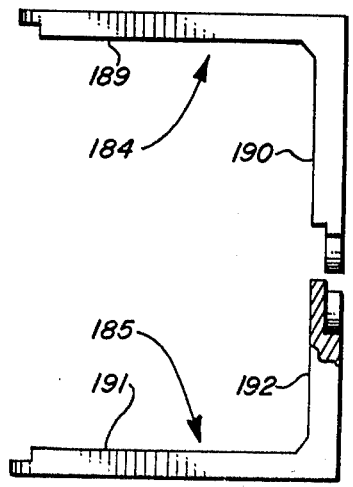
FIG. 28 is a side elevation view of one of the seals shown in FIG. 27.

A preferred seal assembly carried by the piston element 151 for sealingly engaging the chamber 158 is shown in detail in FIGS. 27-29. A first annular seal 182 is contained within a mating groove 183 in the top of the cylindrical hub 151. Although not specifically herein illustrated, a waffled annular spring is located in the bottom of the groove 183 to urge the first annular seal member upwardly into sealing engagement with the underside of the intermediate cover member 108. In a similar manner, a second annular seal member is contained within a mating groove in the bottom of the cylindrical hub 151 and is urged downwardly by a spring engage the intermediate partition 112. It is particularly noted in FIG. 21 that the second annular seal member circumscribes the counterbore 161 to prevent the escape of fluids therefrom into the chamber 158. The vane 152 is sealed within the chamber 158 by a first L-shaped seal member 184 and a second L-shaped seal member 185 carried in a mating groove 187 extending radially from the groove 183 in the top of the cylindrical hub 151 along the top of the vane 152 vertically along the edge of the vane, then inwardly to the annular groove on the bottom side of the cylindrical hub 151. A leaf-type spring 188 in the bottom of the groove 187 urges the horizontal leg 189 of the L-shaped member 184 upwardly against the underside of the intermediate member 108 of the top cover 107 and the vertical leg 190 of the L-shaped member 184 outwardly against the wall of the chamber 158. Similarly, the spring 188 urges the horizontal leg 191 and the vertical leg 192 of the second L-shaped seal member 185 downwardly against the intermediate partition 112 and outwardly against the surface of the chamber 158, respectively. The fluid chambers 160 are sealingly separated by intermediate seal members 193 and 194 carried within the mating longitudinal groove 197 of the cylindrical hub 151 and urged outwardly against the center portion 159 of the chamber 158 by the leaf spring 198.

To achieve maximum sealing between the piston element 151 and the chamber 158 and to maintain the effectiveness of the sealing engagement as the seals wear through normal use, the seal members of the present invention are continuous about the piston element 150 with each member sealingly engaged with each contiguous member. Referring specifically to FIG. 29, the vertical leg 190 of the first L-shaped seal member 184 and the vertical leg 192 of the second L-shaped seal member 185 are provided with notched ends 199 and 200, respectively, which form mating sealing surfaces parallel to the wear surface of the chamber 158. A tab 201 depending from the end 199 is received within a mating groove 202 within the end 200. As will be apparent to those skilled in the art, according to this arrangement, the vertical legs 190 and 192 can be retracted from each other to the extent of the length of the notch in each end thereof, while maintaining the sealing engagement between the piston element 150 and the chamber 158. The same structural arrangement exists between the ends of the first and the second intermediate seal members 193 and 194, respectively. The continuous seal assembly proceds with a notch 203 within the upper surface of the annular seal member 182 to receive the mating notched end 204 of the first L-shaped seal member 184. A second notched segment 207 within the first annular seal member 182 is matingly received within the notch 208 proximate the upper end 209 of the intermediate seal member 193. It is understood herein that all seal members carried by the piston element 150 which are not specifically illustrated or described are engaged with each contiguous seal member in accordance with the structure above-described.

In the general discussion of certain additional features and advantages of the present invention, which discussion follows, the matter of sealing working chambers will be mentioned. Thus, it is pointed out at this time that the seals 93 (as shown in FIG. 3) are illustrative of one method by which the working chambers of the present invention may be sealed. The seal arrangement is shown in greater detail in connection with FIGS. 27 through 29.

In comparison with the present invention, it should be seen and understood that the piston in a conventional reciprocating positive displacement mechanism, which uses a crankshaft, must be supported by the cylinder walls. Also, sufficient clearances must be established between the piston and cylinder walls to prevent binding of the parts during their operation. After such clearances are established, seals may then be introduced on the piston to maintain a fluid tightness in the mechanism. However, due to the lack of fixed positioning of the piston and the necessity of the piston to be supported by its surrounding cylinder, certain limitations are as a result imposed in the use of seal materials.

In the use of the present invention, it is seen that the piston of the present invention is fixedly positioned during operation in such manner that it does not rub or wipe on its adjacent surfaces. Therefore, since the parts do not rub against one another, greater flexibility of materials, both in parts and in seals, is now possible. For example, in conventional reciprocating piston machines, certain material combinations are not usable efficiently for piston surfaces and cylinder wall surfaces, since those parts rub or touch. Since, according to the present invention, this situation of rubbing and touching does not exist, a much greater range in selection of materials for piston surfaces and surrounding surfaces is possible.

It is seen that the present invention has another great advantage, primarily as a result of the fixed locating of the piston, in greater flexiblity of seal materials. In the present invention, certain seal materials which are self-lubricating but brittle may be used so that the working chambers may be operated without benefit of any lubrication other than that afforded by the seal materials themselves. This is made possible because in the present invention there is needed very little physical strength of material in the seals themselves.

Not only may the working chambers of the present invention be run in a lubricant-free manner with the use of self-lubricating seal materials, but it is also seen that due to the fixed locating of the piston of the present invention with respect to its working chambers, a small and controlled clearance may be introduced between the piston surfaces and the working chamber surfaces, and it is seen that there is great new potential for the development of units of the type described in which no seals are necessary.

According to the present invention, the preferred method of obtaining such lubricant-free operation is illustrated by the embodiment of FIGS. 9 through 29. Lubricants required for the operation of the motion translating mechanism box 83, as shown in FIG. 9, and the motion translation mechanism within the first compartment 113 as shown in FIG. 17, can be sealed within that mechanism by means well known to the art. This then allows trunnion pin 82 as shown in FIG. 9 to drive piston 84, as shown in FIG. 11, within piston housing 85 (FIG. 12) and piston housing cover 86 (FIG. 13) using suitable seals mounted on piston 84 which can be made of a suitable self-lubricating material. It is seen that no lubricant is required in the working chambers and the only wear which results will be that which is a result of the seal materials themselves rubbing on fixed surfaces. It is seen that this oil-free embodiment may be easily and economically maintained by the obviously simple replacement of seal materials when they become worn. In fact, it is seen that the entire working chamber assembly may be replaced, if necessary, without maintaining, interfering, or getting involved in any way with the motion translation mechanism of the present invention. It will be apparent to those skilled in the art that in the embodiments disclosed in FIGS. 9 through 14 and in FIGS. 15 through 29, the motion translation mechanism can be provided with an oil sump and pump arrangement, as specifically shown in connection with the embodiment of FIG. 2, transmitted throughout the mechanism by a system of oil galleys and ports as is well-known in the art.

It is further pointed out that there are many other immediate and potential advantages in the construction of the present invention. For example, any shaft seals necessary along trunnion pin 82, as seen in FIG. 9 or the second shaft 142, as seen in FIG. 21, between the motion translation mechanism of the present invention and the unit having the working chambers in it provides a more souble technical problem in that such shaft or trunnion pin 82 does not rotate but merely reciprocates. As a further example, it is pointed out that in the construction of the preferred invention, there is great potential for eliminating vibration and similar problems in such ways as interfaces between the pivot element and the piston element of the present invention which have some designed degree of flexibility, etc. It is further pointed out that the placement of both piston elements on the same side of the motion translation mechanism, as specifically seen in FIG. 19, provides an extremely compact unit which is inherently balanced to provide an extended service life and eliminate vibration. This is accomplished by providing a first shaft 120 having two annular bearing surfaces 130 thereon which are oriented to each other, as described in connection with the description of FIG. 17.

Various changes in the embodiment herein chosen for purposes of illustration in the drawings will readily appear to persons skilled in the art having regard for the disclosure herein. To the extent that such modifications and variations do not depart from the spirit of the invention, they are intended to be included within the scope thereof which is not limited to the embodiments specifically illustrated, but rather only to a fair interpretation of the following claims.

I claim:

1. In a motion translation mechanism for converting rotary movement to reciprocal movement and for converting reciprocal movement to rotary movement, which mechanism includes a stationary housing, a first shaft having a first end and a second end and journaled for rotation intermediate of said ends about the longitudinal axis thereof within said housing, said first end apated for power input or output, an annular bearing surface integral with the second end of said first shaft, the axis of said bearing surface disposed at an angle to and intersecting the axis of said first shaft, an annular bearing carried upon said bearing surface, means carried by the second end of said shaft for retaining said annular bearing upon said bearing surface, a yoke ring disposed about said annular bearing, a pair of diametrically opposed trunion pins extending from said yoke ring, said truion pins journaled for rotatively reciprocating movement within said housing about a longitudinal axis perpendicular to the axis of said first shaft and intersecting the intersection of the axes of said first shaft and said cylindrical bearing, a pair of diametrically opposed bearing pins interconnecting said annular bearing and said yoke ring, said bearing pins having a longitudinal axis perpendicular to the axis of said trunion pins and intersecting the intersection of the axes of said first shaft and said cylindrical bearing and journaled for relative motion between said annular bearing and said yoke ring, a second shaft extending from said yoke ring and having a longitudinal axis coincident with the axis of said trunion pins, the free end of said shaft adapted for power input or output alternate to said first shaft, improvements therein whereby improved wear characteristics are provided for extended service life of said mechanism and whereby said annular bearing is inherently retained upon said annular bearing surface, said improvements comprising:

a. an annular concave generally V-shaped bearing surface formed integrally with said firat shaft by the intersection of two cones having a coincident axis which is disposed at an angle to and intersects the axis of said first shaft; and b. an annular bearing having separable halves and an inside diameter shaped to rotationally mate with said annular bearing surfaces.

2. The improved motion translation mechanism of claim 1, wherein the angle of revolution of each cone about the coincident axis is equal to the angle between the coincident axis and the longitudinal axis of said first shaft.

3. In a motion translation mechanism as recited in the preamble of claim 1, improvements therein in which said second end of said first shaft is extended into and journaled for rotation about the longitudinal axis thereof within said housing thereby providing a bearing support for said first shaft on either side of said annular bearing surface.

4. The improved motion translation mechanism of claim 3, further including:

a. an annular concave generally V-shaped bearing surface formed integrally with said first shaft by the intersection of two cones having a coincident axis which is disposed at an angle to and intersects the axis of said first shaft; and
   b. an annular bearing having separable halves and an inside diameter shaped to rotationally mate with the annular bearing surface of said first shaft.

5. The improved motion translation mechanism of claim 3, wherein the angle of revolution of each cone about the coincident axis is equal to the angle between the coincident axis and the longitudinal axis of said first shaft.

* * * * *